US012392463B1

(12) United States Patent
Wang

(10) Patent No.: US 12,392,463 B1
(45) Date of Patent: Aug. 19, 2025

(54) SOLAR WALL-MOUNTED LAMP

(71) Applicant: QUANZHOU VIITION GIFTS CO., LTD, Quanzhou (CN)

(72) Inventor: Peijun Wang, Jinjiang (CN)

(73) Assignee: QUANZHOU VIITION GIFTS CO., LTD, Quanzhou (CN)

( * ) Notice: Subject to any disclaimer, the term of this patent is extended or adjusted under 35 U.S.C. 154(b) by 0 days.

(21) Appl. No.: 18/924,750

(22) Filed: Oct. 23, 2024

(30) Foreign Application Priority Data

Sep. 24, 2024 (CN) ........................ 202422332713.X

(51) Int. Cl.
*F21S 9/03* (2006.01)
*F21S 8/00* (2006.01)

(52) U.S. Cl.
CPC ............... *F21S 9/035* (2013.01); *F21S 8/036* (2013.01)

(58) Field of Classification Search
CPC .... F21S 8/033; F21S 8/036; F21S 9/03; F21S 9/032; F21S 9/035; F21V 21/108; F21V 21/116
See application file for complete search history.

(56) References Cited

U.S. PATENT DOCUMENTS

| | | | | |
|---|---|---|---|---|
| 2,293,776 A * | 8/1942 | Steber | F21V 31/00 174/54 |
| 5,488,548 A * | 1/1996 | Kwong | F21S 2/005 362/147 |
| 7,988,327 B1 * | 8/2011 | Knoble | F21V 29/70 362/249.02 |
| 11,536,420 B1 * | 12/2022 | Glazer | F21S 2/005 |
| D1,048,511 S * | 10/2024 | Wu | D26/87 |
| 2014/0293591 A1 * | 10/2014 | Kim | F21V 21/32 362/183 |
| 2016/0334070 A1 * | 11/2016 | Cho | F21S 9/035 |

FOREIGN PATENT DOCUMENTS

| | | |
|---|---|---|
| CN | 208041962 U | 11/2018 |
| CN | 213872539 U | 8/2021 |
| CN | 221054845 U | 5/2024 |

* cited by examiner

*Primary Examiner* — Alexander K Garlen
(74) *Attorney, Agent, or Firm* — George D. Morgan

(57) ABSTRACT

The present invention relates to the field of wall-mounted lamps, and provides a solar wall-mounted lamp. The solar wall-mounted lamp includes a lamp holder, a connection pipe connected to the lamp holder, a lampshade connected to the connection pipe, and a lamp source arranged in the lampshade, where a solar assembly is arranged on the lamp holder and/or the connection pipe. The solar assembly is not arranged on the lampshade, which the weight of the lampshade is reduced, a fixing effect for the whole solar wall-mounted lamp is improved, higher aesthetic property as a whole is achieved, and the technical problem of influence on the aesthetic property is solved due to that a solar assembly of a wall-mounted lamp is installed on a lampshade and the wall-mounted lamp is prone to deformation or falling-off because of a large weight of a front end.

10 Claims, 12 Drawing Sheets

SOLAR WALL-MOUNTED LAMP

CROSS-REFERENCE TO RELATED APPLICATIONS

The application claims priority to Chinese patent application No. 202422332713X, filed on Sep. 24, 2024, the entire contents of which are incorporated herein by reference.

TECHNICAL FIELD

The present invention relates to the field of wall-mounted lamps, and especially relates to a solar wall-mounted lamp.

BACKGROUND

According to an existing solar wall-mounted lamp, a lampshade and an installation seat are connected through a connection arm, and a solar assembly is arranged on the lampshade, so that the weight of the lampshade at a front end is increased, and therefore the connection arm bears a large weight, moreover, the aesthetic property is influenced, and especially in the case of strong-wind weather, the connection arm is possibly deformed or even be damaged, so that falling-off of the whole wall-mounted lamp is also caused.

The Chinese patent application number 202323217349.4 discloses a solar outdoor wall-mounted lamp, and the solar outdoor wall-mounted lamp includes an installation seat, a connection arm, a solar panel, a lamp body, a storage battery, and a light-controlled sensor, where the lamp body includes a waterproof lampshade, a lamp holder, a lamp bulb, and a light-transmitting plate, the waterproof lampshade is provided with a first window and a second window at an interval in the circumferential direction of the waterproof lampshade, the first window and the second window are adjacent, the dimensions of the light-transmitting plate are matched with the dimensions of the first window, the light-transmitting plate is arranged on the corresponding first window, the dimensions of the solar panel are matched with the dimensions of the second window, and the solar panel is arranged on the corresponding second window. According to the structure, the connection arm bears a large weight due to the weight of the lamp body at a front end, moreover, the aesthetic property is influenced, and especially in the case of strong-wind weather, the connection arm is possibly deformed or even be damaged.

SUMMARY

Therefore, with regard to the above problem, the present invention discloses a solar wall-mounted lamp. The technical problem of influence on the aesthetic property due to that a solar assembly of a wall-mounted lamp is installed on a lampshade, and the wall-mounted lamp is prone to deformation or falling-off because of a large weight of a front end, is solved.

In order to realize the above purpose, the present invention adopts the following technical solution:

a solar wall-mounted lamp includes a lamp holder, a connection pipe connected to the lamp holder, a lampshade connected to the connection pipe, and a lamp source arranged in the lampshade, where a solar assembly is arranged on the lamp holder and/or the connection pipe, the solar assembly includes at least one solar cell panel, and a storage battery connected to the solar cell panel, the solar assembly is connected with the lamp source through a lamp wire, and the lamp wire is arranged in the connection pipe.

Further:

the lamp holder includes a lamp box, and the cross section of the lamp box is an isosceles right-angled trapezoid or a right-angled triangle, and the solar cell panel is installed on an inclined surface of the lamp box.

An angle between the solar cell panel and the horizontal plane is 30 to 60 degrees.

The lamp holder includes a lamp box, the lamp box is a cuboid, and the solar cell panel is fixed to the top surface of the lamp box.

The lamp holder includes a lamp box, and a fixed seat arranged on the lamp box, and a plurality of fixing holes are formed in the fixed seat.

The lamp holder includes a lamp box, the lamp box is provided with an opening, and the solar cell panel is detachably fixed to the opening.

A connection hole is formed in the lamp holder, and the connection pipe is detachably connected to the connection hole.

The connection hole is formed in the bottom of the lamp box.

The lamp holder and the connection pipe are rotatably connected through a rotary shaft.

The rotary shaft is a damping rotary shaft.

Through adopting the above technical solution, the beneficial effects of the present invention are that:

the solar assembly in the present invention is installed on the lamp box or a lamp pipe, and the weight of the lampshade is reduced compared with a traditional solar wall-mounted lamp, so that a weight difference between the two ends of the connection pipe is reduced, balance between the two ends is further realized, an action force on the connection pipe is reduced, the life of the connection pipe is prolonged, and even in the case of strong wind, the connection pipe is not prone to deformation, and the whole solar wall-mounted lamp is not prone to falling-off, so that a fixing effect for the whole solar wall-mounted lamp is improved; and moreover, the solar assembly is not arranged on the lampshade, so that higher aesthetic property is achieved. When the solar wall-mounted lamp is used under an outdoor eave, the solar assembly is closer to a wall or a hanging object, and a better rain-shading effect of the eave, the wall or the hanging object on the solar assembly is achieved, so that the solar assembly can be better protected. Further, the solar cell panel is installed on the inclined surface of the lamp box, so that the solar assembly is facilitated to absorb solar energy, and moreover, the length of the lamp box can be reduced, so that packaging and transporting are facilitated. Further, the solar cell panel is fixed to the top surface of the lamp box, and the solar cell panel with the structure has the best absorption effect, but the length of the lamp box is relatively large. Further, the opening is formed in the lamp box, so that installation, detachment, and maintenance can be facilitated; further, the connection hole is formed in the bottom and has a certain waterproof effect; further, the lamp box and the connection pipe are rotatably connected, and the lampshade can be rotated to different positions for illumination, and especially at a corner of the wall, the solar wall-mounted lamp can illuminate the both sides of the corner respectively, so that the illumination range is expanded, and the illumination effect is improved.

MARKS OF THE DRAWINGS

Figure 1:
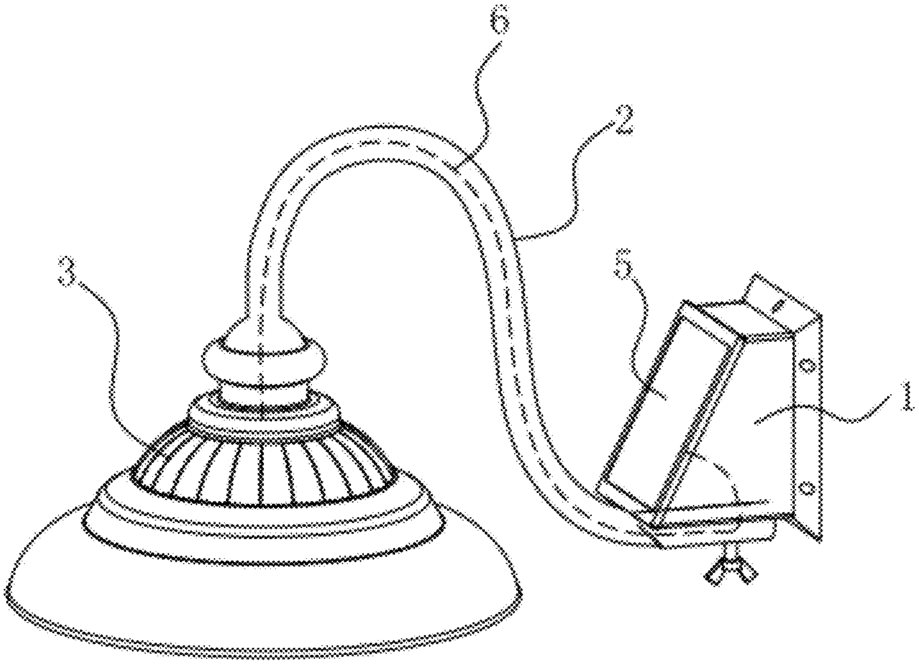
FIG. 1 is a schematic structural diagram of a solar wall-mounted lamp in an example 1.
Figure 2:
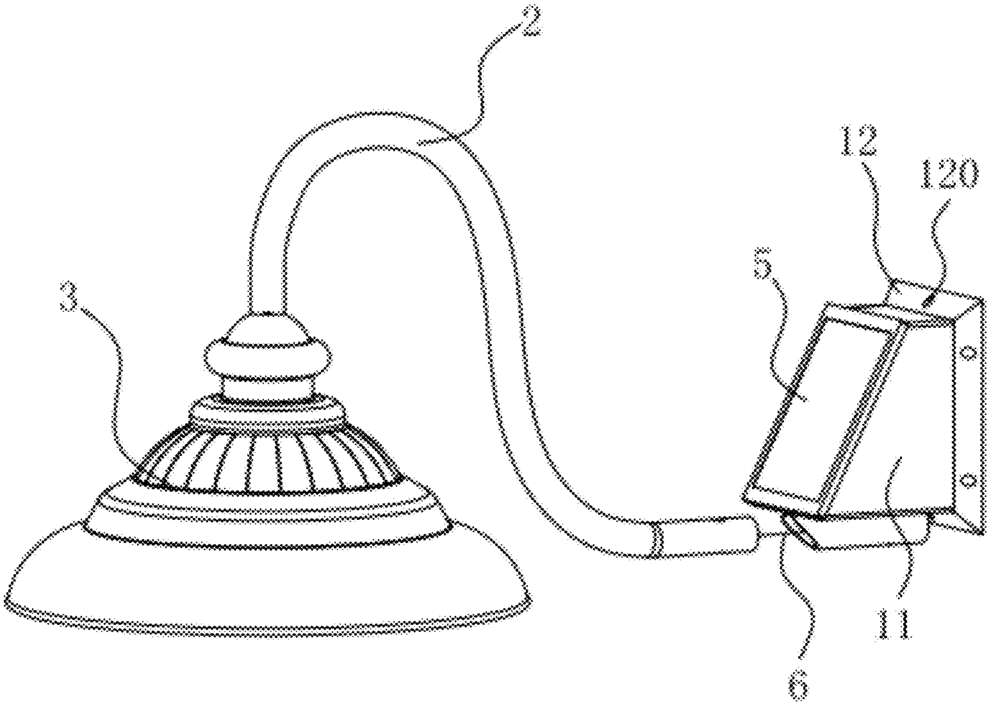
FIG. 2 is a partial exploded view of FIG. 1.
Figure 3:
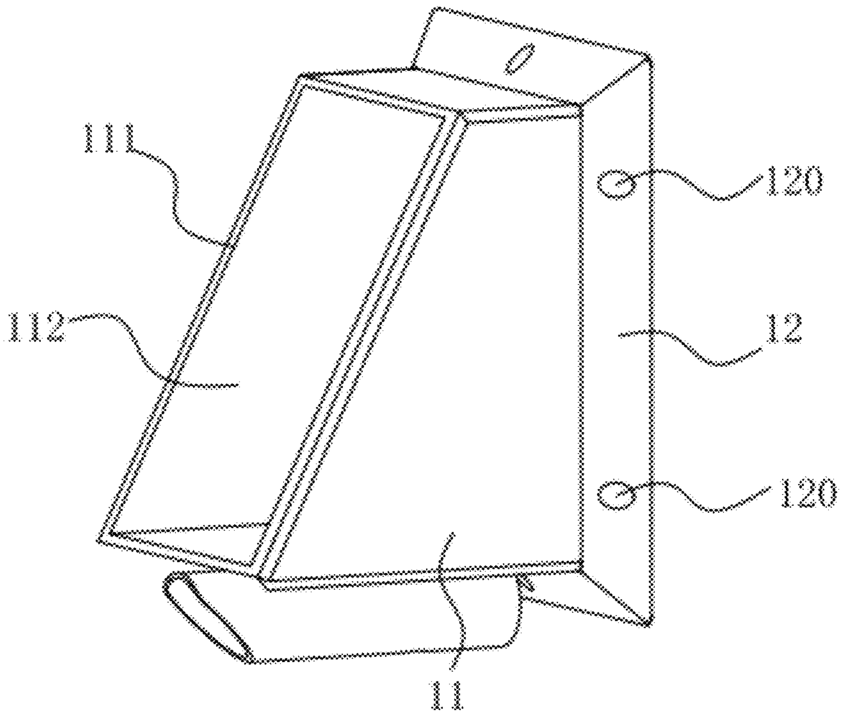
FIG. 3 is a schematic structural diagram of a lamp holder.

1.lamp holder; 11. lamp box; 110. connection hole; 111. inclined surface; 112. opening; 12. fixed seat; 120. fixing hole; 2. connection pipe; 3. lampshade; 4. lamp source; 5. solar assembly; 51. solar cell panel; 6. lamp wire; 61. first lamp wire; 62. second lamp wire; 63. first connector; 64. second connector; 65. pipe body; 66. lead wire; 67. connection head; and 7. rotary shaft.

DETAILED DESCRIPTION OF THE EMBODIMENTS

The present invention will be further described below in conjunction with the drawings and specific implementation manners.

Example 1

Referring to FIG. 1 to FIG. 5, the example 1 provides a solar wall-mounted lamp, and the solar wall-mounted lamp includes a lamp holder 1, a connection pipe 2 connected to the lamp holder 1, a lampshade 3 connected to the connection pipe 2, and a lamp source 4 arranged in the lampshade 3, where the lamp holder 1 includes a lamp box 11, and a fixed seat 12 connected to the lamp box 11, the lamp box 11 is provided with a solar assembly 5, the solar assembly 5 includes a solar cell panel 51 installed on the lamp box 11, and a storage battery connected to the solar cell panel 51, the cross section of the lamp box 11 is an isosceles right-angled trapezoid, and the solar cell panel 51 is installed on an inclined surface 111 of the lamp box 11. The lamp box 11 is provided with an opening 112, the opening 112 is located in the inclined surface 111, the solar cell panel 51 is detachably fixed to the opening 112, the solar assembly 5 is connected with the lamp source 4 through a lamp wire 6, and the lamp wire 6 is arranged in the connection pipe 2 in a penetrating manner. A plurality of fixing holes 120 are formed in the fixed seat 12. A connection hole 110 is formed in the bottom of the lamp box 11, and the connection pipe 2 is detachably connected to the connection hole 110.

An angle between the solar cell panel 51 and the horizontal plane is usually set to be 30 degrees to 60 degrees, but may also be set to be other angles such as 0 degree, 15 degrees, 75 degrees, 90 degrees, etc., and when the angle is larger, the effect of absorbing solar light is relatively poor, but the length of the lamp box 11 may be set to be smaller.

There may also be two or even more solar cell panels 51; and there may also be two or even more storage batteries.

The solar cell panel 51 includes a solar panel capable of absorbing solar energy, and also includes an inverter; in an example, the solar cell panel 51 may include a switch for controlling on/off of the lamp source 4, a photoresistor, a time relay or other components; in an example, the solar cell panel 51 may include a control chip; and in an example, the solar cell panel 51 may be a general term for integration of solar cells, is a well-known structure, and will not be repeated here.

In an example, a photoresistor may be arranged on the solar wall-mounted lamp, and a function of automatically turning off during the day and automatically turning on at night is realized through the photoresistor; in another example, a switch may be arranged on the solar wall-mounted lamp, and a manner of manually turning on and turning off is adopted; and in another example, a photoresistor and a switch are arranged on the solar wall-mounted lamp simultaneously, and both a manual function and an automatic function are realized.

The fixed seat 12 is usually fixed to a wall in a manner that bolts or screws penetrate through the fixing holes 120; in an example, the fixed seat 12 may not be provided with the fixing holes 120, and is fixed to the wall or a column through buckles or clamping elements, or in a welding manner; and in another example, the lamp holder 1 may also not be provided with the fixed seat 12, and the lamp box 11 is fixed to the wall through bolts or other fixing components.

In an example, the opening 112 may be opened and closed through a sealing cover, and the solar cell panel 51 may be installed on the sealing cover or may not be installed at other positions.

The connection pipe 2 and the lamp box 11 may be fixed through threaded connection, buckles or bolts, or in other manners. In another example, the connection pipe 2 may also be fixed to the lamp box 11 in a non-detachable manner and through welding or in other manners, and the structure is inconvenient to package, transport, and maintain.

A circular pipe, a square pipe, a triangular pipe or pipe structures with other shapes may be adopted for the connection pipe 2.

Figure 4:
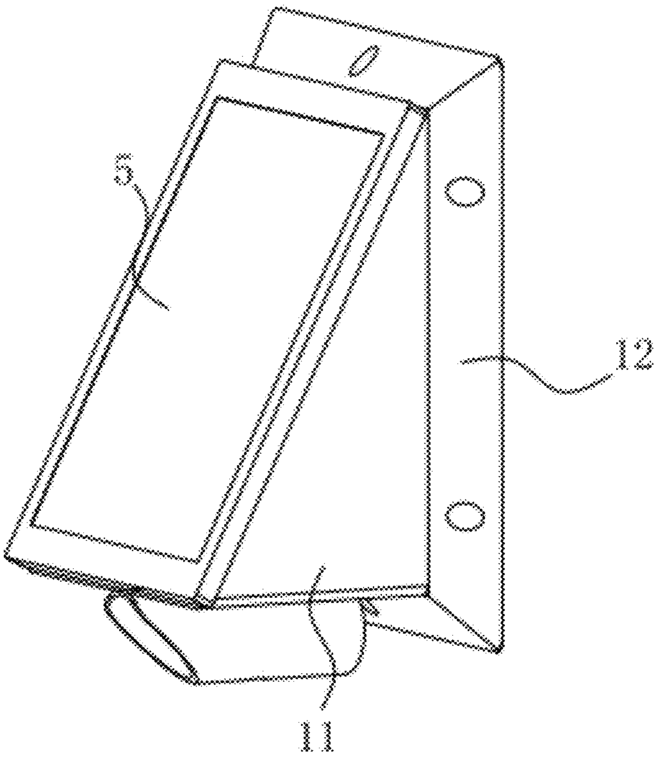
FIG. 4 is a schematic structural diagram showing that a lamp box is triangular.
Figure 5:
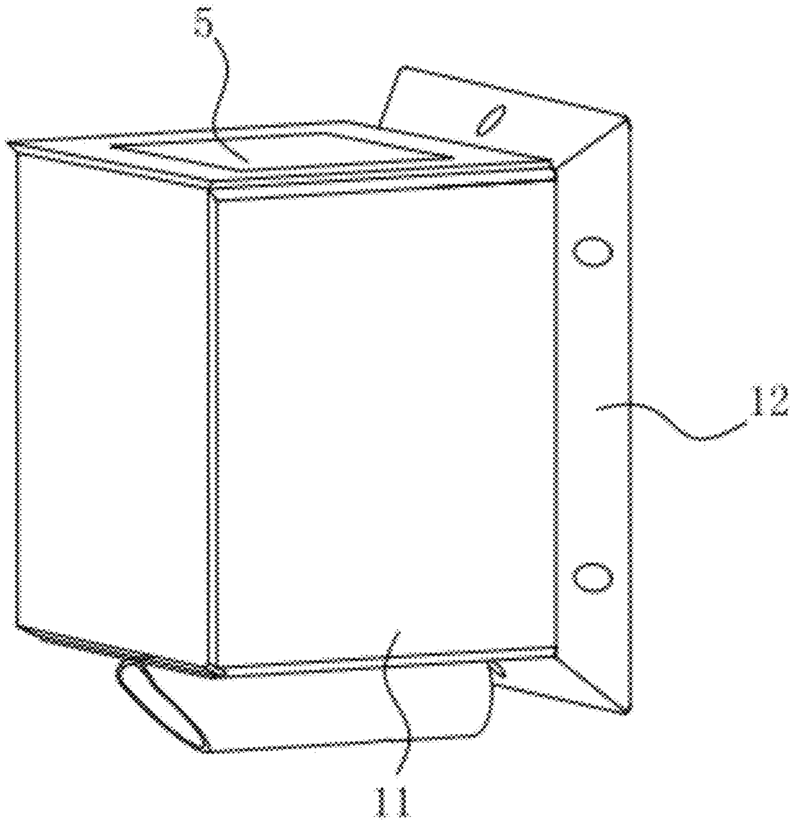
FIG. 5 is a schematic structural diagram showing that the lamp box is rectangular.
Figure 6:
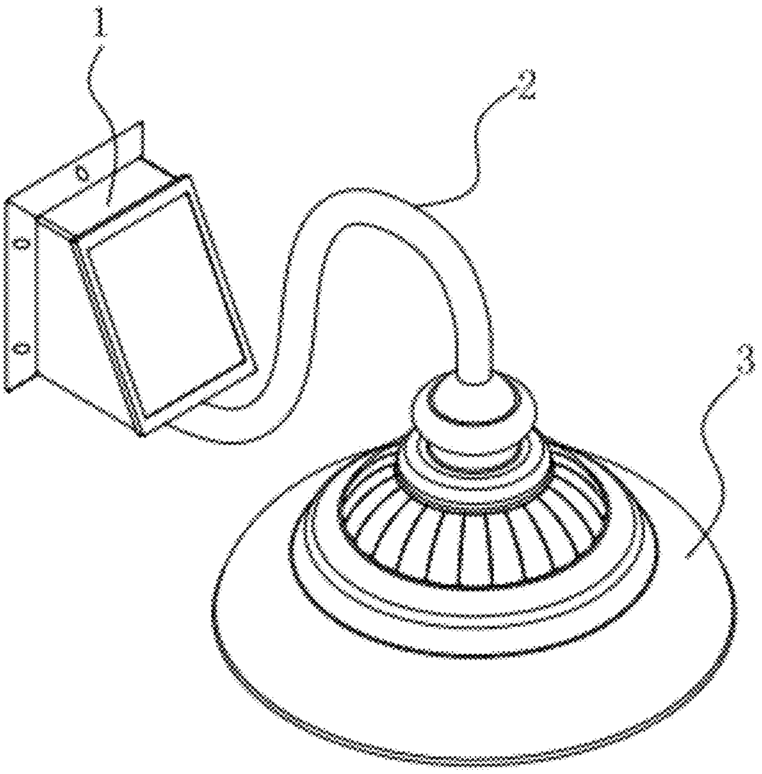
FIG. 6 is a schematic structural diagram of a solar wall-mounted lamp in an example 2.
Figure 7:
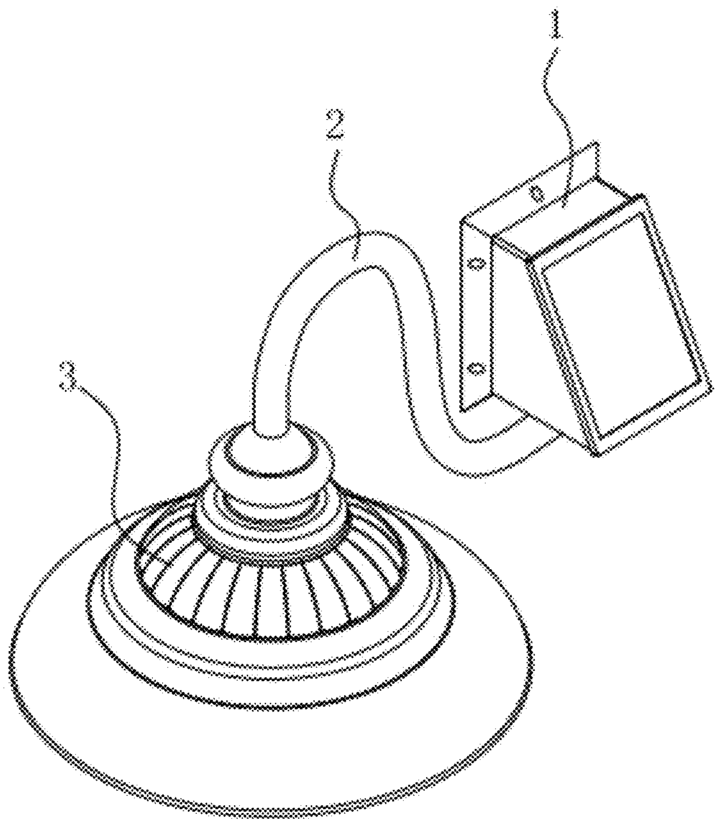
FIG. 7 is a schematic structural diagram of another state of the solar wall-mounted lamp shown in FIG. 6.
Figure 8:
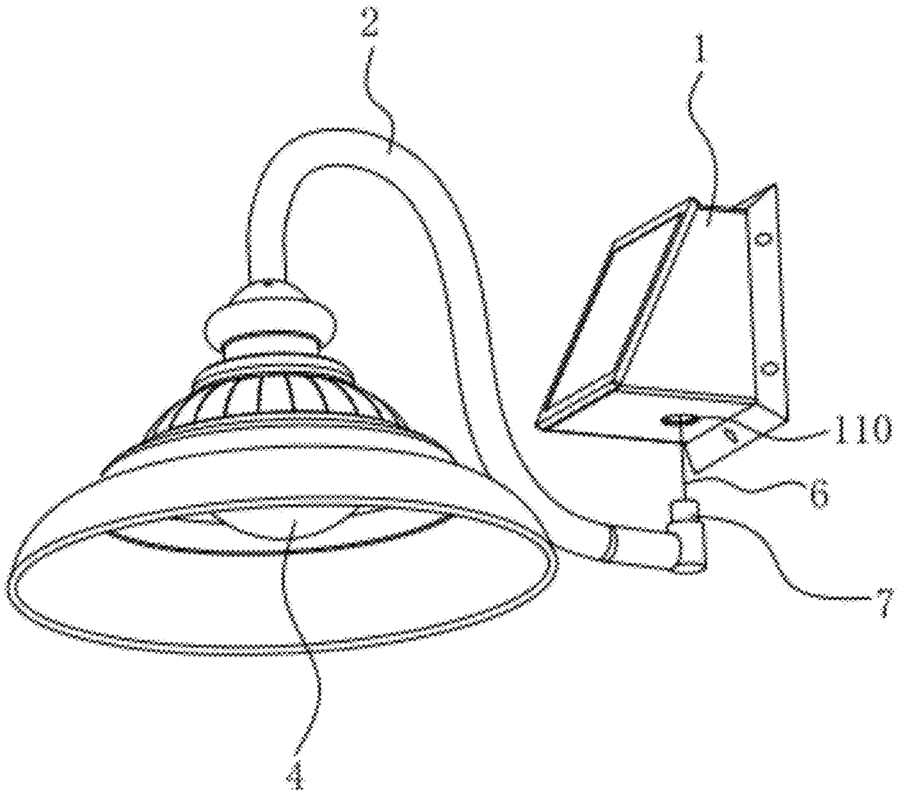
FIG. 8 is an exploded view of the example 2.

Referring to FIG. 4, in an example, the cross section of the lamp box 11 is a right-angled triangle structure; and referring to FIG. 5, in another example, the lamp box 11 is a cuboid, and the solar cell panel 51 is fixed to the top surface of the lamp box 11.

The lamp box 11 is usually configured to be a hollow structure, components can be installed in the lamp box 11, and a hexagon or other structures may also be adopted for the cross section of the lamp box 11; and in an example, the lamp box 11 may also be a solid seat body structure, and the solar assembly 5 is fixed outside the lamp box 11.

The connection hole 110 may also be formed in the top or other positions of the lamp box 11.

A working manner of the example 1 is that:

the solar wall-mounted lamp is fixed to the wall in a manner that screws penetrate through the fixing holes 120, the solar assembly 5 is not arranged on the lampshade 3, so that an action force stressed by the connection pipe 2 can be reduced, even in the case of strong wind, the connection pipe 2 is not prone to bending, so that the life of the connection pipe 2 is prolonged, and in the case of heavy rain, a better rain-shading effect of an eave, the wall or a hanging object on the solar assembly 5 is achieved, so that the solar assembly 5 can be better protected, and the solar cell panel 51 is arranged in an inclined manner, and capable of better absorbing solar energy.

Example 2

Referring to FIG. 1 to FIG. 8, a main difference between the example 2 and the example 1 is that: a lamp box 11 and a connection pipe 2 in the example 2 are rotatably connected through a rotary shaft 7.

The rotary shaft 7 is a damping rotary shaft, and after an angle is adjusted, the lampshade 3 does not need to be fixed through other components, so that rapid adjustment can be realized; in another example, a damping rotary shaft may not be adopted as the rotary shaft 7, but after an angle is adjusted, the lampshade 3 needs to be fixed through arranging fixing components, and latches and sockets, buckles or other structures may be adopted as the fixing components; and in another example, a damping rotary shaft may not be adopted as the rotary shaft 7, and fixing components also do not need to be arranged, but the lampshade 3 is prone to movement while being subjected to an external force.

The lamp box 11 and the connection pipe 2 in the example 2 are rotatably connected, the lampshade 3 can be rotated to different positions for illumination, and especially at a corner of the wall, the solar wall-mounted lamp can illuminate the both sides of the corner respectively, so that the illumination range is expanded, and the illumination effect is improved.

Example 3

Figure 9:
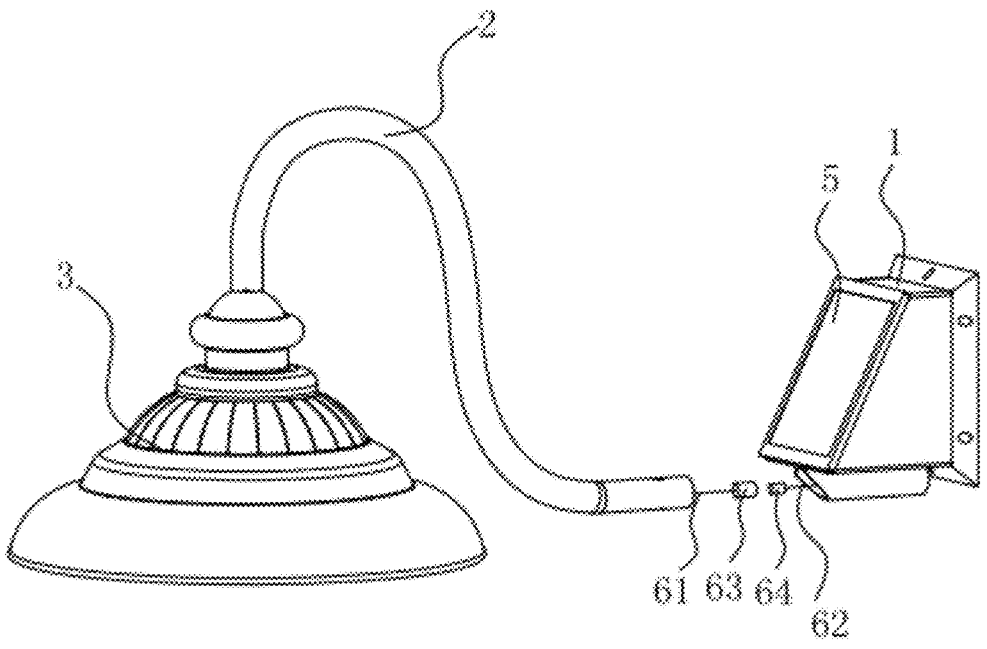
FIG. 9 is an exploded view of an example 3.
Figure 10:
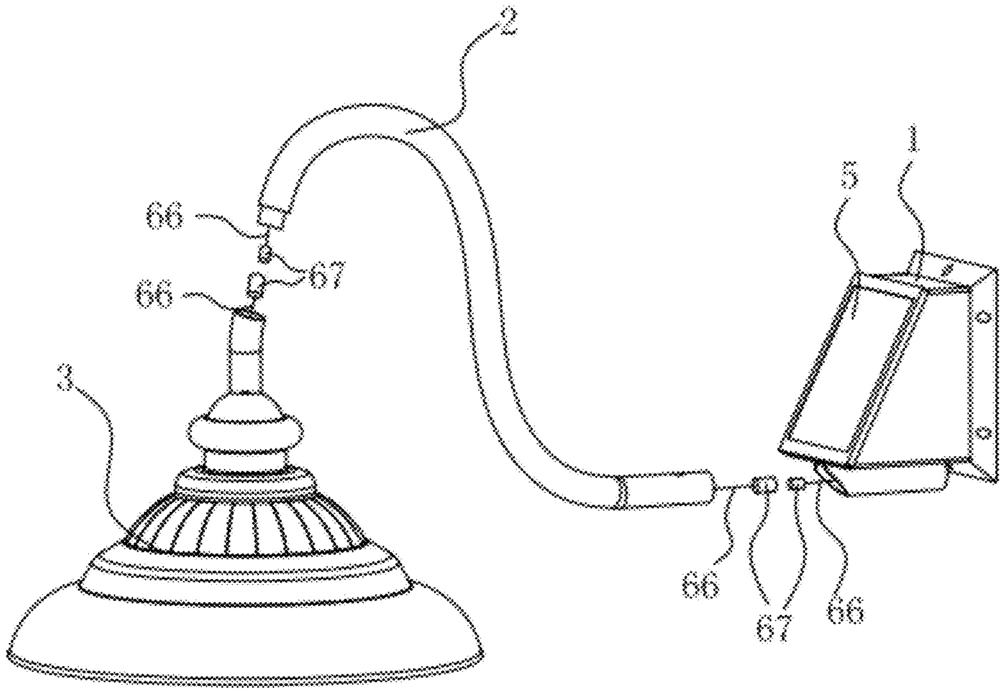
FIG. 10 is a schematic diagram of another structure of the example 3.

Referring to FIG. 9 and FIG. 10, a main difference between the example 3 and the example 1 is that: a lamp wire 6 in the example 3 includes a first lamp wire 61 and a second lamp wire 62, the first lamp wire 61 and the second lamp wire 62 are detachably connected, one end of the first lamp wire 61 is connected to a lamp source 4, a first connector 63 is arranged at the other end of the first lamp wire 61, the first connector 63 extends to an end part of a connection pipe 2, one end of the second lamp wire 62 is connected to a solar assembly 5, a second connector 64 is arranged at the other end of the second lamp wire 62, and the first connector 63 and the second connector 64 are detachably connected.

The first connector 63 and the second connector 64 are connection heads 67 between two electric wires, and are well-known components.

The connection pipe 2 may be configured to be a structure formed through connecting two, three, or even more pipe bodies 65, and the lamp wire may also be configured to be a structure formed through connecting three or more lead wires 66. Referring to FIG. 10, in another example, the connection pipe 2 may be divided into a structure including three pipe bodies 65, the lamp wire includes three detachable lead wires 66, the adjacent lead wires 66 are connected through the connection head 67, and the structure is convenient to package and transport.

Example 4

Figure 11:
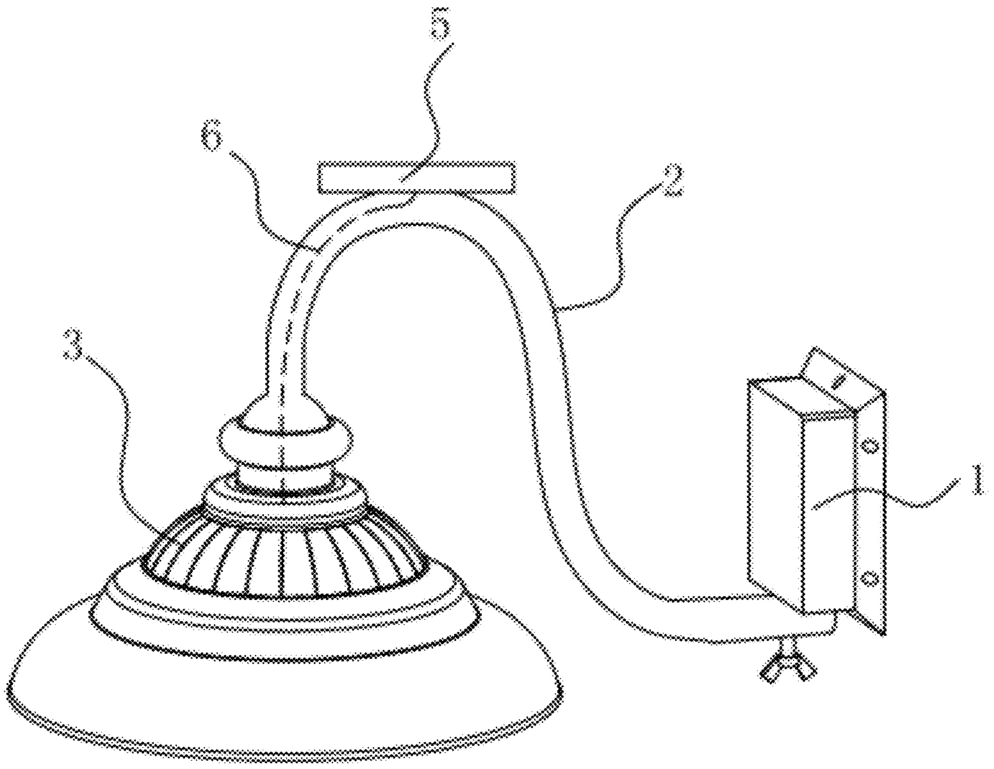
FIG. 11 is a schematic structural diagram of an example 4.

Referring to FIG. 11, a main difference between the example 4 and the example 1 is that: a solar assembly 5 in the example 4 is arranged on the connection pipe 2.

The solar assembly 5 may be arranged at a front end, a rear end, or other positions of the connection pipe 2.

Figure 12:
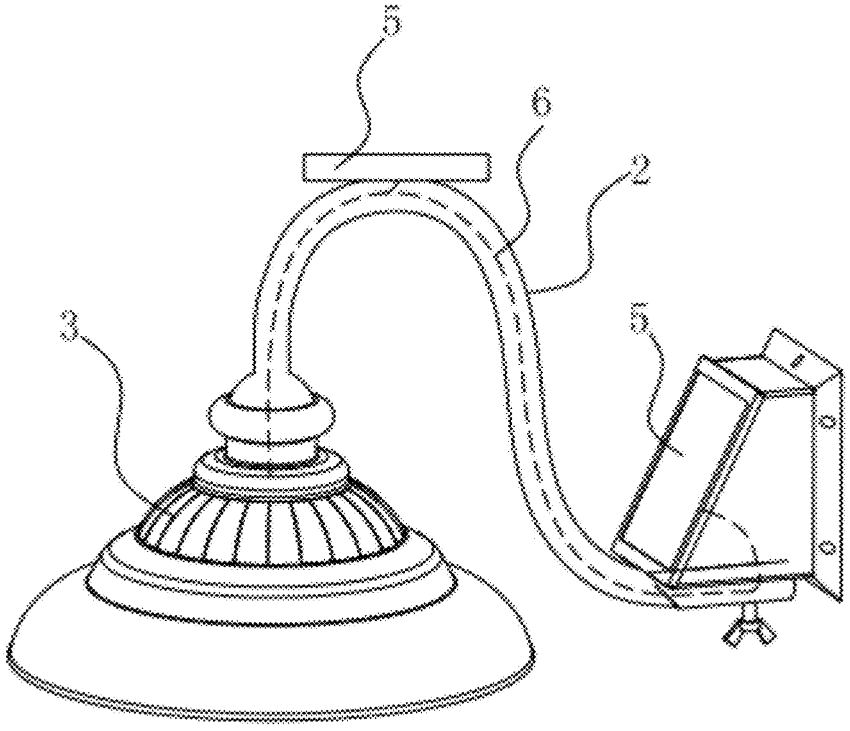
FIG. 12 is a schematic diagram of another structure of the example 4.

Referring to FIG. 12, there may also be two solar assemblies 5, and the two solar assemblies 5 are arranged on the connection pipe 2 and a lamp box 11 respectively.

Although the present invention is specifically demonstrated and introduced in combination with the preferred implementation solutions, those skilled in the art should understand that, various variations may be made on the present invention in form and detail without deviating from the spirit and the scope which are limited by the appended claims, of the present invention, and are all fall within the protection scope of the present invention.

What is claimed is:

1. A solar wall-mounted lamp, comprising a lamp holder, a connection pipe connected to the lamp holder, a lampshade connected to the connection pipe, and a lamp source arranged in the lampshade, wherein a solar assembly is arranged on the lamp holder the solar assembly comprises at least one solar cell panel, and a storage battery connected to the solar cell panel, the solar assembly is connected with the lamp source through a lamp wire, and the lamp wire is arranged in the connection pipe; wherein the lamp holder comprises a lamp box and the solar cell panel is installed on an inclined surface of the lamp box.

2. The solar wall-mounted lamp according to claim 1, wherein the cross section of the lamp box is an isosceles right-angled trapezoid or a right-angled triangle.

3. The solar wall-mounted lamp according to claim 2, wherein an angle between the solar cell panel and the horizontal plane is 30 to 60 degrees.

4. The solar wall-mounted lamp according to claim 1, wherein the lamp box is a cuboid.

5. The solar wall-mounted lamp according to claim 1, wherein a fixed seat is arranged on the lamp box, and a plurality of fixing holes are formed in the fixed seat.

6. The solar wall-mounted lamp according to claim 1, wherein the lamp box is provided with an opening, and the solar cell panel is detachably fixed to the opening.

7. The solar wall-mounted lamp according to claim 1, wherein a connection hole is formed in the lamp holder, and the connection pipe is detachably connected to the connection hole.

8. The solar wall-mounted lamp according to claim 7, wherein the connection hole is formed in the bottom of the lamp box.

9. The solar wall-mounted lamp according to claim 1, wherein the lamp holder and the connection pipe are rotatably connected through a rotary shaft.

10. The solar wall-mounted lamp according to claim 9, wherein the rotary shaft is a damping rotary shaft.

* * * * *